Oct. 18, 1966  V. WASSILIEFF  3,279,571
RATIONAL COUPLING DEVICE
Filed April 27, 1964  2 Sheets-Sheet 1

Oct. 18, 1966 V. WASSILIEFF 3,279,571
RATIONAL COUPLING DEVICE
Filed April 27, 1964 2 Sheets-Sheet 2

United States Patent Office 3,279,571
Patented Oct. 18, 1966

1

3,279,571
RATIONAL COUPLING DEVICE
Victor Wassilieff, 84 Rue de l'Assomption, Paris, France
Filed Apr. 27, 1964, Ser. No. 362,900
Claims priority, application France, May 2, 1963, 933,459
13 Claims. (Cl. 192—38)

This invention relates to a device for selectively coupling a pair of members in rotation relative to one another. In an important aspect of the invention the two members include a drive member and a driven member, and the coupling device of the invention serves to couple and uncouple the driven member from the drive member, manually or otherwise, thereby providing a clutch or equivalent mechanism, e.g. a brake.

In another aspect of the invention, the two members again include a drive member and a driven member, and the coupling device of the invention serves to couple the driven member with the drive member for one sense of relative rotation between the members but not for the other sense of relative rotation. Thus the invention in this aspect provides a unidirectional coupling, or an overrunning clutch or freewheel mechanism.

In yet another aspect of the invention, the two members are generally stationary, one being a fixed member and the other being adjustable in rotation relative to the first about an axis. The improved coupling device may then serve to block the second member normally relative to the first member in a selected angular setting, and is operable temporarily to uncouple the adjustable member from the fixed member for altering its angular setting with respect to the latter.

In still another aspect, the members include a single drive member and two different driven members associated therewith, and the invention may then provide a dual coupling device which is operable selectively to couple the drive member with either one of the driven members, thereby providing a gear shift mechanism or the like.

Objects of this invention accordingly include the provision of a versatile rotational coupling device which can be constructed to perfrom any of the mechanical functions outlined above and conceivably other related functions, and which will be simple and inexpensive to make, maintain and operate, will be compact, strong and durable, and highly positive and reliable in its effecting a great number of repeated coupling actions smoothly and efficiently. Other objects will appear.

In a broad aspect the rotational coupling device of the invention comprises, in combination with a pair of coaxial members, e.g. a drive and a driven members, first means comprising a circumferential set of radially displaceable balls coaxial with said members and second means comprising a coupler element having an axially tapered peripheral surface coaxial with said members and engageable with said balls, one of said first and second means being connected for rotation with one of said members and said first and second means being mounted for relative axial displacement; and further means rotatable with the other of said members and having surfaces wedgeably engageable with said balls when the balls occupy one radial position, whereby relative axial displacement between said first and second means in a predetermined direction will cause said tapered surface to cam said set of balls radially to said one radial position into wedgeable engagement with said surfaces of the further means so as to couple said members in rotation with respect to one another. The coupler element in certain forms of the invention is a freely rotatable and radially movable floating element. This permits automatic compensation for any eccentricity resulting from inaccurate machining of any of the parts.

2

As will be apparent from the further disclosure herein, the above basic mechanism can be modified in a variety of ways so as to achieve any of the mechanical functions described above as constituting aspects of the invention.

The invention will now be described for purposes of illustration but not of limitation with reference to the accompanying drawings, which relate to a number of exemplary embodiments hereof, and wherein.

Figure 1:
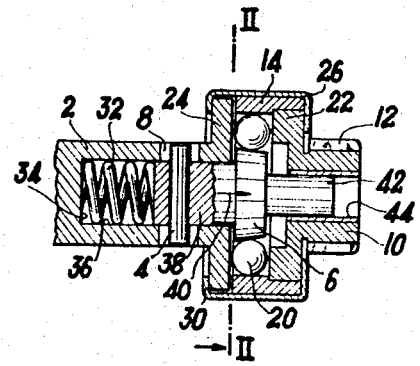
FIG. 1 is a simplified view in axial section of an embodiment of the invention which constitutes a undirectional coupling or overrunning clutch.
Figure 2:
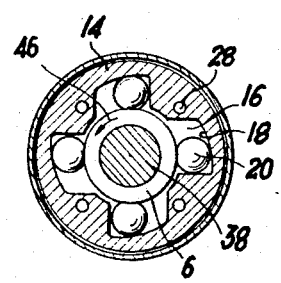
FIG. 2 is a transverse sectional view of the same device on line II—II of FIG. 1.

In the embodiment shown in FIGS. 1 and 2, a unidirectional coupling according to the invention comprises a drive shaft 2 provided with a transverse end flange 24 and a driven shaft 10 axially aligned with the drive shaft and provided with a transverse end flange 22 facing and spaced from the flange 24. The driven shaft 10 is shown as having gear teeth 12 formed around its periphery for meshing engagement with gearing not shown.

The drive shaft 2 has a blind bore 36 formed in it from the end of the shaft directed towards the driven shaft, and the driven shaft 10 similarly has a bore 42 formed in it in axially aligned relation to bore 36. A coupling element axially displaceable a limited distance between and relative ot the shafts 2 and 10 includes a cylindrical guide shank 38 slidably received in bore 36, another cylindrical guide shank 42 slidably received in bore 44, and an intermediate coupling part 6 integral with both guide shanks and of larger radius than they, the part 6 being formed with a tapered or frustoconical periphery decreasing in radius in the direction from the drive shaft 2 towards the driven shaft 10. Rotation of the coupling element 38–6–42 relative to drive shaft 2 is prevented by means of a cotter pin 4 extending transversely through the guide shank portion 38 and having ends received in diametrically opposed slots 8 formed in the drive shaft 2 and which are axially elongated to allow for the limited axial displacements of the coupling element.

Secured around the periphery of flange 22 of the driven shaft is an annular flange or drum member 14 which has a portion extending axially towards the flange 24 of the drive member, and this portion of the drum member 14 is formed internally with a number of, herein four, angularly equispaced recesses 16 having their radially outer wall surfaces 18 circumferentially tapered to provide wedging ramps of increasing radius in the clockwise direction according to FIG. 2. Balls 20 are positioned in the respective recesses 16, and the balls are confined in their recesses, radially by the outer frustoconical surface of coupling part 6 and by the ramp surface 18 of the related camming recess, and axially by the facing transverse end surfaces of the flanges 24 and 22.

A retainer casing 26 has an outer wall portion surrounding flanges 22, 24 and drum member 14 and has end flanges bent back to engage the rear or outer surfaces of the flanges 22 and 24 as at 30, the casing 26 being secured to the driven member flange by means of screws as at 28. A helical compression spring 36 is seated between the end wall 34 of blind bore 36 and the end face of guide shank 38 and urges the coupling element 38–6–42 in the rightward direction indicated by the arrow 40 in FIG. 1.

It will be seen that the action of spring 32 tends to move the coupling element 6 in the axial direction which acts to permit wedging engagement of the balls 20 between the tapered surface of element 6 and the ramps surfaces 18. In these conditions, assuming the drive shaft 2 is rotated in the counterclockwise sense indicated by arrow 46 in FIG. 2, the coupling element 6 revolving in the same sense will tend to force the balls 20 in the circumferential sense which acts to wedge or jam the balls further into the spaces between its periphery and the ramp surfaces 18, and consequently to rotate the drum 14 and the driven shaft 10 bodily with the drive shaft. If however the drive shaft 2 were to be rotated in the opposite direction, i.e. clockwise in FIG. 2, then coupling member 6 would drive the balls 20 in an unwedging direction and the driven shaft 10 would not be rotated, that is the drive and driven shafts would be uncoupled.

Figure 3:
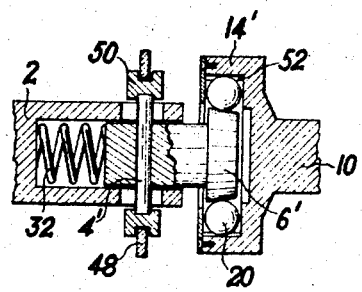
FIG. 3 is a simplified axial section of another embodiment which constitutes a clutch, brake or blocking device.
Figure 4:
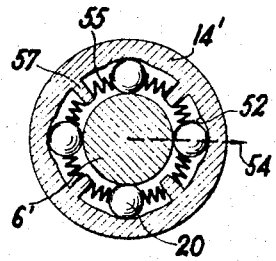
FIG. 4 is a transverse sectional view taken through the set of balls of the device shown in FIG. 3.
Figure 6A:
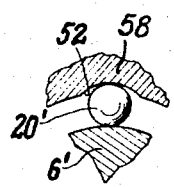
FIG. 6a is a fragmentary sectional view to an enlarged scale and showing the formation of the wedging surfaces engaging the ball.

The embodiment of the invention illustrated in FIGS. 3 and 4 relates to a clutch coupling which is selectively operable to an engaged and a disengaged conditions, e.g. a manually controlled clutch brake or the like. The general arrangement is largely similar to that shown in FIGS. 1 and 2 and corresponding parts have been given the same reference numbers. In this case however the recesses formed in the drum member 14' are each formed with a configuration which is symmetrical to opposite sides of a related midradius such as 54. As here shown, each camming recess includes a central cavity 52, e.g. part-cylindrical in shape of a relatively small radius so as to locate the related ball 20 in a centered position within its recess, and symmetrically formed ramp surfaces extending from either end of said central cavity 52. In each camming recess, a pair of small springs 55 have their outer ends acting against stop ribs 57 and their inner ends acting against opposite areas of the related ball 20 to urge the ball resiliently to its central location.

In this embodiment the transverse pin 4' has its ends secured internally of a ring member 50 which thus revolves with the drive shaft 2, and a clutch actuating fork 48 engages the ring 50 and is shiftable manually or through other means not shown, so as to shift the coupling element 6 in the axial direction from the advanced position in which the balls 20 are held in a radially outward displaced position by means of the tapered surface of the coupling element 6, to a retracted position in opposition to the action of spring 32. When the coupling element is in its normal advanced position just referred to, rotation of the drive shaft 2 in either sense will displace the balls 20 circumferentially away from their centered positions in the recesses 52, thereby wedging the balls against the walls of the camming recesses and thus cause bodily rotation of the driven shaft 10 with the drive shaft 2. When on the other hand the shifting fork 48 is actuated (leftward in FIG. 3) to retract the coupling member 6 against the action of spring 32, the balls 20 become unwedged and the driven shaft 10 is uncoupled from the drive shaft 2.

The embodiment illustrated in FIGS. 5 and 6 again constitutes a manually controlled clutch as the embodiment last described. In this case however, the coupling member 6', which has no guide shanks attached to it, is free both in axial and rotational movement with respect to the drive shaft 2'. The balls 20' on the other hand, here shown as being only two in number, are bodily rotatable with the drive shaft for which purpose the balls are located in respective radial recesses 56 formed in diametrically opposed positions through the tubular wall of the shaft 2'. Moreover, as shown, the outer surface of the balls 20' engage arcuate recesses 52, formed in semi-circular segments 58 which is turn frictionally engage with their outer surfaces, the surfaces of grooves formed in the drum member 14", which here is shown integral with the driven shaft 10. For shifting the coupling member 6' from its advanced clutch engaging position to its retracted, disengaging or decoupling position in opposition to the spring 32, there is shown a push rod 60 slidable axially through a bore in the driven shaft 10' and engaging the coupler 6'. An annular wire spring 62 inserted in an outer peripheral groove in both friction segments or shoes 58 biases the latter in a radially inward direction. The operation of this embodiment will be readily understood in the light of the explanations given with reference to FIGS. 3–4, and it will be noted that the clutch construction just described is advantageous in that owing to the rotational freedom of the coupling member 6' the shifting movements between clutch engaging and disengaging conditions involve rolling rather than sliding motion between the various components.

Figure 6:
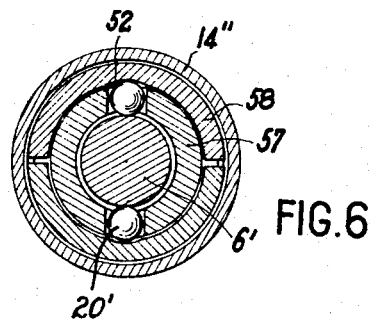
FIG. 6 is a corresponding transverse sectional view of the form shown in FIG. 5.
Figure 7:
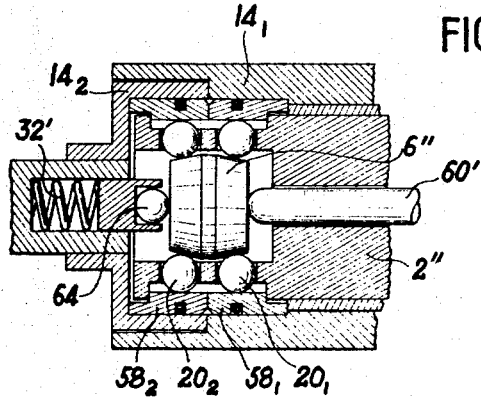
FIG. 7 is a simplified axial sectional view of an embodiment of the invention which constitutes a dual coupling or gear shift device.

FIG. 7 shows an embodiment of the invention which constitutes a two-way clutch or gear shift for selectively coupling a drive shaft 2" with one or the other of two driven shafts. The two driven shafts are not shown, but are to be understood as being rigidly secured to the two respective drum members $14_1$ and $14_2$. The clutch includes a dual coupling element 6" having two oppositely tapered portions which respectively engage the sets of balls $20_1$ and $20_2$ seated in radial passages formed in axially spaced relation through the tubular wall of the drive shaft 2". As clearly shown in FIG. 7, coupling element 6" is a freely rotatable and radially movable floating element. This permits automatic compensation for any eccentricity resulting from inaccurate machining of any of the parts. The balls $20_1$ and $20_2$ outwardly engage the friction segments $58_1$ and $58_2$ which are each formed in a manner similar to the segments 58 of FIGS. 5–6. The friction segments $58_1$ engage the inner peripheries of the driven member drum $14_1$, and the segments $58_2$ engage the inner peripheries of the driven-member drum $14_2$. Coupling element 6" is biassed in one axial sense, herein rightward, by a spring 32' mounted in a cup-like seat here shown as being connected to one of the driven members, and acting on the coupler 6" by way of plunger and ball 64 to allow for relative rotation between said spring and coupler. The means for shifting the coupler 6" in opposition to the spring 32' is again shown in the form of a pushrod 60' slidable in an axial bore in the drive shaft 2".

In this arrangement, the spring 32' normally tends to place the coupler element 6" in an axial position in which the balls $20_1$ are wedged in their camming recesses and balls $20_2$ are free, so that driven member $14_1$ is coupled with drive shaft 2" while driven member $14_2$ is uncoupled. When pushrod 60' is actuated to displace coupler 6" to its leftward position (according to FIG. 7), then driven member $14_1$ is decoupled from the drive shaft 2" while driven member $14_2$ is coupled to it. The members $14_1$ and $14_2$ may form the inputs to respective kinematic transmission chains having different transmission ratios, in which case the device just described will serve as a gear shift device. For example, such a device may be incorporated in the drive system of a washing machine having two rotational velocities, one for washing and the other for centrifugal drying or wringing operations, in order to operate the machines at either of these two velocities.

The tapered coupling elements such as 6, 6', 6" used according to the invention may be provided with different taper angles, a range of angles of from about 3 to 6° having been found satisfactory. Small taper angles are generally to be preferred since the smaller the angle the smaller will be the value of axial reaction thrust exerted against the coupling element in operation. However, the taper angles used should be large enough to ensure a positive and reliable unwedging action against the balls. While the optimum taper angle to be used in each particular case will depend on a number of factors including the relative dimensioning and nature of the materials involved, angles in the range of from about 3 to 6° have generally been found satisfactory, with the lower limit of this range being preferred. The axial contour of the peripheral surface of the tapered coupling element is not necessarily linear (i.e. not necessarily a frustoconical surface), but may be curved.

Figure 8:
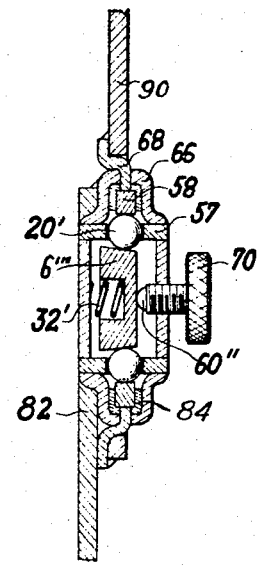
FIG. 8 is a sectional view of an embodiment of the invention which constitutes a blocking device for a pair of angulary adjustable members.

The coupling arrangement illustrated in FIG. 8 is especially suitable as an angular setting adjustment means between a pair of stationary parts, e.g. for adjusting the inclination setting between the seat and backrest of a vehicle seat, though many other uses can of course be found. In this embodiment, there is provided a fixed part 82 corresponding to the drive member in the preceding embodiments, and an adjustable part 90 corresponding to the driven member, which is rotatable with respect to the fixed part 82 and blockable in any selected angular setting. The fixed part 82 has a tubular hub member 57 integral with it, and a set of two or more balls 20' are positioned in angular spaced orifices formed through the wall of said hub. The rotatable member 90 is formed with a circular opening adapted to surround the hub member 57 and having circumferentially spaced lugs 68 secured (e.g. welded) around the opening and projecting radially inward through slots formed in a flanged annular cover member 66 mounted around the periphery of the tubular hub wall 57. Attached to the inner ends of the lugs 68 is an annular member or drum 84 which in the present example is made resiliently deformable. Friction segments 58 are arranged in engagement with the outer surface areas of the balls 20' for cooperation with said balls and with the resilient camming drum 84 in a manner generally similar to that described with reference to FIG. 6. A frustoconical coupling element 6''' engaging the inner peripheries of the balls 20' is axially displaceable within the tubular part 57 and is urged in the axial direction for wedging the balls 20' by the action of a spring 32' seated in a socket of the coupler 6''' and against a transverse wall of the tubular part 57. The coupler 6' can be urged in the reverse sense in opposition to spring 32' by a thumb screw having a knurled head 70 and a pusher tip 60" engaging the end surface of the coupler 6''', said screw being engaged in a threaded hole of the opposite end wall of the tubular portion 57. As in the form shown in FIG. 7, the coupling element 6''' is a freely rotatable and radially movable floating element. This permits automatic compensation for any eccentricity resulting from inaccurate machining of any of the parts and the clearance which permits the above mentioned movement of the coupling element 6''' is clearly shown in FIG. 8.

In the operation of this device, supposing it is desired to alter the angular setting of part 90 relative to part 82, e.g. for modifying the inclination of the backrest of a vehicle seat, knurled knob 70 is rotated to displace coupler 6''' leftward according to the figure against the force of spring 32'. The resulting retraction of the tapered surface of element 6''' frees the balls 20' in their camming recesses in segments 58, so that the member 90 can then be manually rotated to its desired new angular position relative to member 82 about the center axis of the coupler 6'''; after the new setting has been obtained, the knob 70 is backed off so that the spring 32' advances the coupler 6''' to displace the balls 20' radially outward and block them in their camming recesses.

Figure 9:
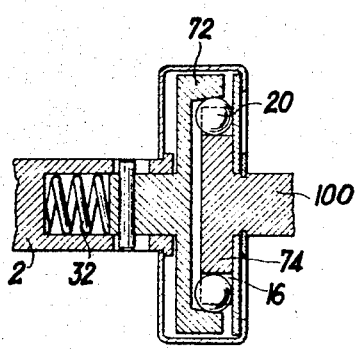
FIG. 9 is an axial sectional view of a modified version of a unidirectional coupling generally similar to that shown in FIGS. 1–2.

The embodiment of the invention illustrated in FIG. 9 is a unidirectional coupling similar to the one first described (FIGS. 1–2) but modified in that the relationship between certain parts is reversed. That is, the axially shiftable coupler element, here designated 72, is formed with a frustoconically tapered surface which is internal rather than external, and is engageable with the radially outer, not the radially inner, areas of the balls 20. Complementarily, the camming recesses 16 are here formed as outwardly-open recesses in the periphery of a flange 74 integral with the driven shaft 100, the radially inner wall surfaces of said recesses being formed as camming ramps corresponding in form and function to the camming ramp surfaces 18 shown in FIG. 2, and are engageable with the radially inner areas of the balls 20. It will be readily apparent that the operation of this embodiment is entirely equivalent to that of the embodiment shown in FIGS. 1–2 so that further description is superfluous.

Figure 10:
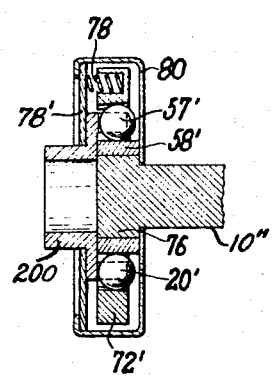
FIG. 10 is a similar view of yet another modification of a unidirectional coupling according to the invention.

The further modification of a unidirectional coupling shown in FIG. 10 resembles the one just described in that the frustoconical coupling surface is formed internally of an annular element 72' which is axially displaceable relative to the drive and driven shafts 200 and 10'' and engages the outer areas of the balls 20'. The annular coupler 72' in this case is not provided with an axial guide shank in the drive shaft as was the case in FIG. 9, and is urged axially (rightward in the drawing) by a plurality of compression springs such as 78 seated in angularly spaced sockets formed in the member 72 and reacting against a transverse flange 78' of the drive shaft 200. As clearly shown in FIG. 10, the coupler 72' is a freely rotatable and radially movable floating element. This movement of the coupler 72' is permitted by reason of the fact that the springs 78 may slide on the surface of the flange 78'. The above described movement of the coupler 72 permit automatic compensation for any eccentricity resulting from inaccurate machining of any of the parts.

Figure 5:
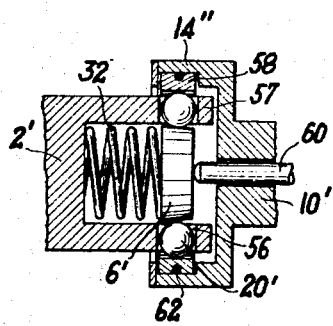
FIG. 5 is an axial sectional view of another embodiment of a clutch device according to the invention constituting a modification of the device shown in FIGS. 3–4.

The balls 20' are in this construction arranged to rotate bodily with the drive shaft 200 by being retained in passages 57' formed in a flange integral with the drive shaft, as in the embodiment shown in FIGS. 5–6 described earlier. A pair of friction segments 58' surrounding the driven shaft 10'' have camming recesses formed in their outer periphery as will be understood from the description of earlier embodiments, and the balls 57' are retained in said recesses with their radially inner surfaces engaging the ramp-shaped bottom surfaces of said recesses. A flanged sheet-metal casing 80 has one side secured to the driven shaft 10'' and is bent around the exterior of the assembly to retain the balls 20' and the remaining components in assembled relation.

In operation, the springs 78 urge the coupling element 72' rightward so as to press the balls radially inward whereupon rotation of the drive shaft 200 in one direction will force the balls into wedging relation with the ramp surfaces of the camming recesses in the friction segments 58', and the said segments press inwardly on to the periphery of the driven shaft 10'' to drive it in bodily rotation with the drive shaft. When the drive shaft 200 is rotated in the reverse sense, the balls are unwedged and the driven shaft is uncoupled from the drive shaft.

It will be apparent that various modifications other than the ones disclosed herein may be conceived within the scope of the invention. Thus, the functions of the drive and driven shafts may be interchanged in all of the embodiments disclosed without impairing the operation of the device.

Features described in connection with some of the embodiments may well be incorporated in others while still providing an operative mechanism.

What I claim is:

1. A coupling device comprising in combination with coaxial members, a first means comprising a plurality of circumferentially disposed balls coaxial with said members, and a second means comprising a freely rotatable and radially movable floating coupler element having an axially tapered peripheral surface substantially coaxial with said members and engagable with said balls, means for yieldably biasing said second means in an axial direction with respect to said first means, said first means being constrained against rotation with respect to one of said members, further means constrained for rotation with the other of said members and having wedging surfaces engagable with said balls, whereby upon axial movement of said second means in a predetermined direction with respect to said first means, said tapered surface will engage and move said balls radially into engagement with the wedging surfaces on said further means to lock said members against relative rotation with respect to each other.

2. A device as defined in claim 1 in which said balls are fixed against axial movement with respect to at least one of said members and in which said second means is axially movable with respect to said members and said balls.

3. A device as defined in claim 1 in which said wedging surfaces are of circumferentially symmetrical formation, whereby engagement of said balls with said wedging surfaces will lock said members against relative rotation with respect to each other in either direction.

4. A device as defined in claim 1 in which said balls are constrained for rotation with one member and in which said further means comprises at least two radially movable arcuate segments having said wedging surfaces on the inner peripheries and with the outer peripheries frictionally engagable with the other member for rotation therewith when said balls are in wedging engagement with said wedging surfaces.

5. A device as defined in claim 4 in which resilient means is provided for biasing said segments radially inwardly.

6. A device as defined in claim 1 in which said tapered peripheral surface faces radially outwardly and engages said ball radially inwardly of the ball centers and in which said wedging surfaces face radially inwardly and engage said balls radially outwardly of the ball centers.

7. A device as defined in claim 1 in which said tapered peripheral surface faces radially inwardly and engages said balls radially outwardly of the ball centers and in which said wedging surfaces face radially outwardly and engage said balls radially inwardly of the ball centers.

8. A device as defined in claim 1 in which said yieldable biasing means comprises a spring, one of said members having an axial passage, and a push rod slidably disposed in said passage for engaging said second means to move the same in opposition to said spring.

9. A device as defined in claim 1 and including three coaxial members, in which said first means comprises two axially spaced series of circumferentially disposed balls, said second means having two oppositely directed axially spaced tapered peripheral surfaces substantially coaxial with said members, each tapered surface being engagable with a corresponding series of balls, said further means comprising two axially spaced elements, one element being constrained for rotation with a second of said members and the other element being constrained for rotation with the third of said members, said one element having a series of wedging surfaces engagable with one series of balls, said other element having a series of wedging surfaces engagable with the other series of balls, said biasing means serving to move one tapered surface to engage and move one series of balls into engagement with the wedging surfaces on said one element to lock said one member and said second member against relative rotation with respect to each other, and actuating means for moving said second means in opposition to said biasing means to move the other tapered surface to engage and move the other series of balls into engagement with the wedging surfaces on said other element to lock said one member and said third member against relative rotation with respect to each other.

10. A device as defined in claim 9 in which said actuating means comprises a push rod slidably received in an axial passage in said one member.

11. A device as defined in claim 1 in which one of said members is stationary and the other of said members is rotatable with respect to one member, and screw threaded means on said one member engagable with said second means to move the same in opposition to said biasing means to permit rotation of said other member with respect to said one member.

12. A device as defined in claim 11 in which said further means comprises at least two radially movable arcuate segments having said wedging surfaces on the inner peripheries and with the outer peripheries frictionally engagable with said other member for rotation therewith when said balls are in wedging engagement with said wedging surfaces.

13. A device as defined in claim 12 in which resilient means is provided for biasing said segments radially inwardly.

References Cited by the Examiner

UNITED STATES PATENTS 2,497,361   2/1950   Kesterton _____ 192—38

FOREIGN PATENTS 459,860   9/1913   France.
131,309   11/1920  Great Britain.
145,695   11/1921  Great Britain.
458,213   12/1936  Great Britain.

DAVID J. WILLIAMOWSKY, *Primary Examiner.*